United States Patent [19]

Akimoto et al.

[11] Patent Number: 5,032,859
[45] Date of Patent: Jul. 16, 1991

[54] SHUTTER WITH LENS DRIVE MECHANISM

[75] Inventors: Kazuo Akimoto; Miyoshi Tanikawa; Toshiaki Hirai, all of Chiba, Japan

[73] Assignee: Seikosha Co., Ltd., Tokyo, Japan

[21] Appl. No.: 444,071

[22] Filed: Nov. 30, 1989

[30] Foreign Application Priority Data

Nov. 30, 1988 [JP] Japan ............................... 63-303530

[51] Int. Cl.$^5$ ................................................ G03B 1/18
[52] U.S. Cl. ................................. 354/195.1; 354/234.1
[58] Field of Search ............... 354/195.11, 195.1, 234.1

[56] References Cited

U.S. PATENT DOCUMENTS

| 4,576,460 | 3/1986 | Daiteku et al. | 354/195.1 X |
| 4,648,701 | 3/1987 | Ogihara et al. | 354/234.1 X |
| 4,933,695 | 6/1990 | Ishida et al. | 354/234.1 |
| 4,974,006 | 11/1990 | Shinozaki et al. | 354/234.1 |

Primary Examiner—Michael L. Gellner
Assistant Examiner—Howard B. Blankenship
Attorney, Agent, or Firm—Jordan and Hamburg

[57] ABSTRACT

A drive mechanism for a camera having a lens including a drive member, a motor for driving the drive member in a clockwise and a counterclockwise direction, a range setting device operated by the drive member operable to effect movement of a lens member to a plurality of positions corresponding to a plurality of focused positions of the lens when the drive member is rotated by the motor, an exposure actuation device operable upon actuation to effect exposure operation of the camera, and actuating cams on the drive member for actuating the exposure actuation device as the range setting device maintains a focused position of the lens.

20 Claims, 5 Drawing Sheets

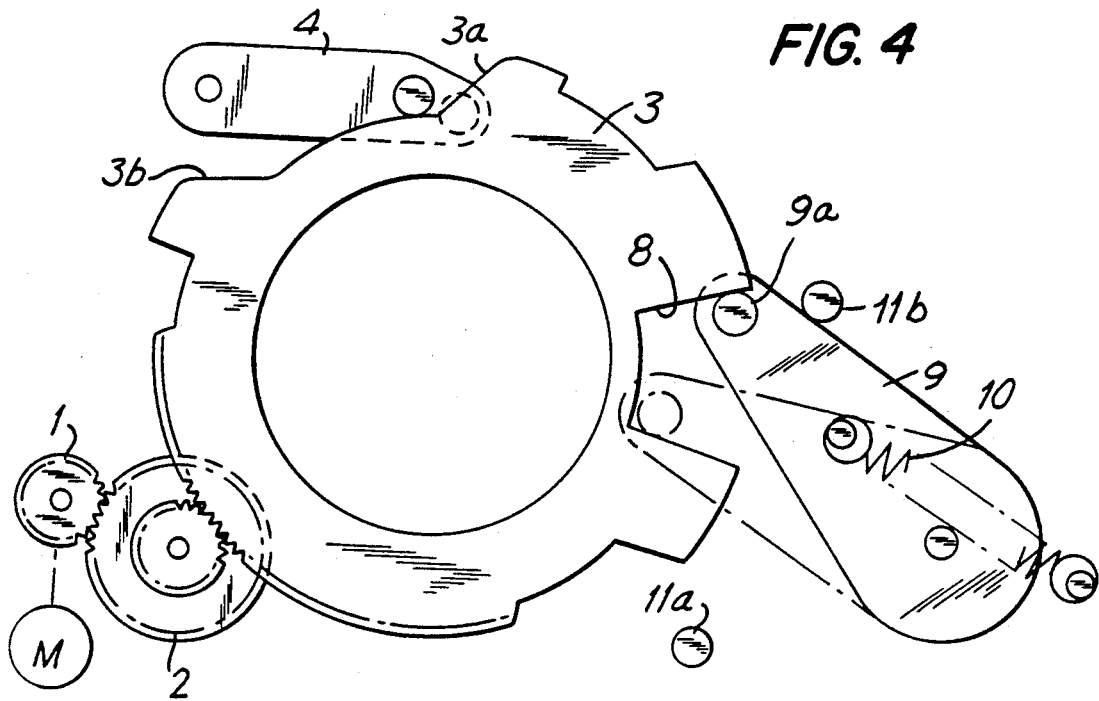
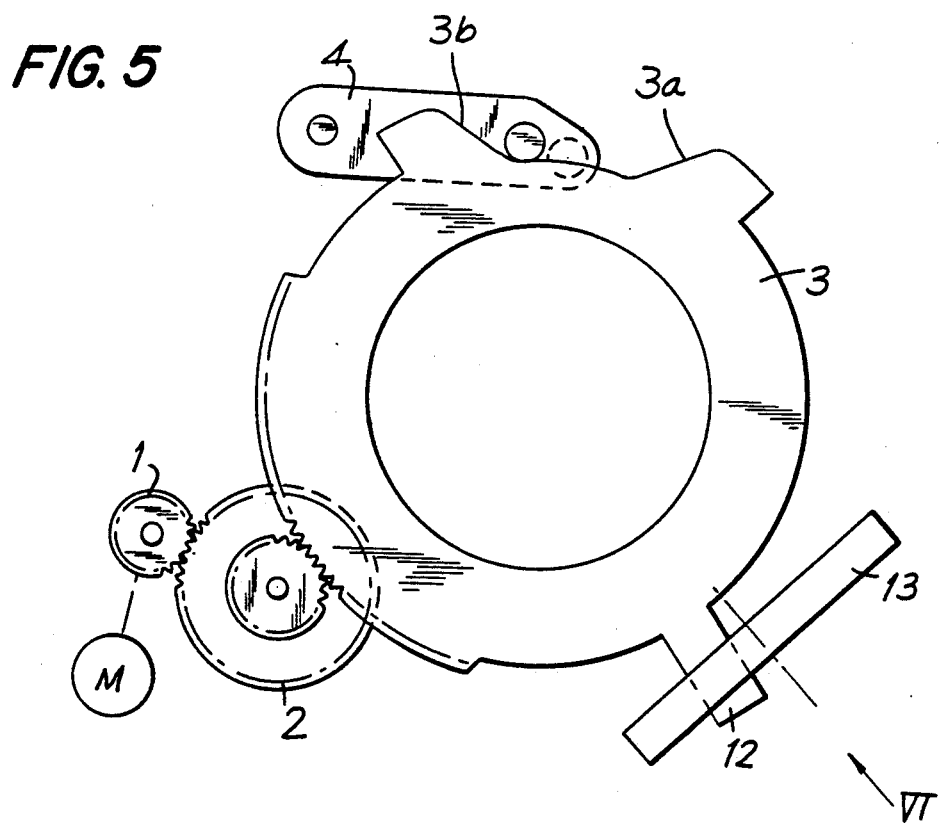

SHUTTER WITH LENS DRIVE MECHANISM

The present invention relates to a shutter with a lens drive mechanism used in an automatic focusing and automatic exposure type camera.

BACKGROUND OF THE INVENTION

In a recent known compact camera, there is provided a shutter with a lens drive mechanism which performs lens focusing automatically. Such a shutter with a lens drive mechanism is shown in FIG. 11, and has been proposed in Japanese Utility Model Application No. SH062-133112.

In this shutter with a lens drive mechanism, a drive ring 101 and a range ring 102 are rotatably driven by a non-illustrated step motor through a pinion 103 and an idler 104, thereby moving a photographing lens from an initial position so as to actuate exposure, That is, in order to set the photographing lens to a position corresponding to a focusing signal, the range ring 102 attached with the photographing lens is driven to rotate and the range ring 102 is retained at a proper position by a retaining lever 106.

The drive ring 101 is driven to rotate so as to rotate a sector lever 105, thereby to actuate exposure. When exposure actuation is performed, the state in which the range ring 102 is retained by the retaining lever 106 is released by a release lever 107, thereby to drive and rotate the range ring 102 and the drive ring 101 to the initial position. In such a manner, by controlling the range ring 102 and the drive ring 101 with the step motor, the impact when the photographing lens returns to the initial position is reduced.

In such a conventional shutter with a lens drive mechanism, however, the range ring 102, the retaining lever 106, the release lever 107 and the like have been required in order to set the photographing lens at a focused position and actuate exposure. Accordingly, the construction becomes complicated as a whole for the shutter with a lens drive mechanism, and also a large number of parts are required.

SUMMARY OF THE INVENTION

In order to solve such problems, according to the present invention, a shutter with a lens drive mechanism includes a drive member for performing movement to a focused position of a photographing lens and exposure actuation, a motor for driving the drive member to rotate reciprocatingly, and a sector lever which has a sector mechanism to perform exposure actuation when the drive member is driven to rotate reciprocatingly by the motor, the drive member being provided with a range setting means which moves the photographing lens to a focused position by the aforesaid rotation, and a plurality of exposure actuation areas for performing exposure actuation in accordance with the focused position of the photographing lens.

When a focusing signal is output from an auto-focus unit, a motor rotates the drive member and moves the photographing lens to a focused position by a range setting means. At the same time, a selector lever is rotated by an exposure actuation area of the drive member and a sector mechanism is actuated so as to actuate exposure. Therefore, a range ring, a retaining lever, a release lever and the like in a conventional unit are no longer required, thus making it possible to obtain a simple construction of the shutter as a whole and to reduce the number of parts.

BRIEF DESCRIPTION OF THE DRAWINGS

FIG. 3 and FIG. 4 show a second embodiment of a shutter with a lens drive mechanism according to the present invention, FIG. 3 being a front view of the shutter and FIG. 4 showing the actuation of this range setting means;

FIG. 5 to FIG. 8 show a third embodiment of a shutter with a lens drive mechanism according to the present invention, FIG. 5 being a front view of the shutter, FIG. 6 being a perspective view along an arrow marked VI in FIG. 5, and FIG. 7 and FIG. 8 showing the operation of the range setting means thereof;

Figure 1:
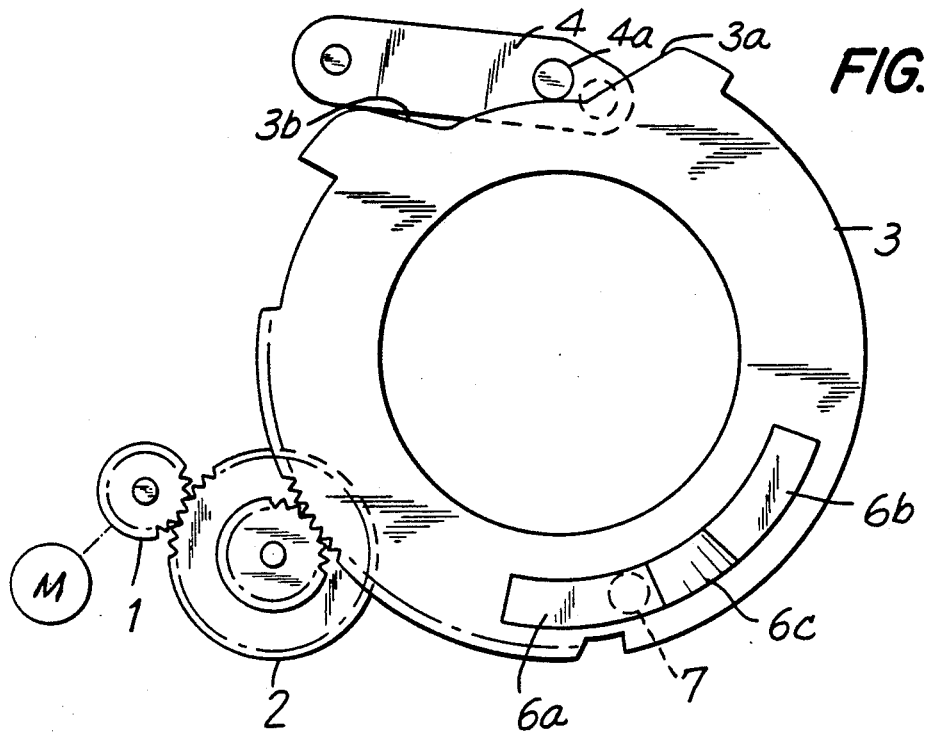
FIG. 1 and FIG. 2 show a first embodiment of a shutter with a lens drive mechanism according to the present invention, FIG. 1 being a front view of this shutter and FIG. 2 being a side view showing a range setting means.
Figure 2:
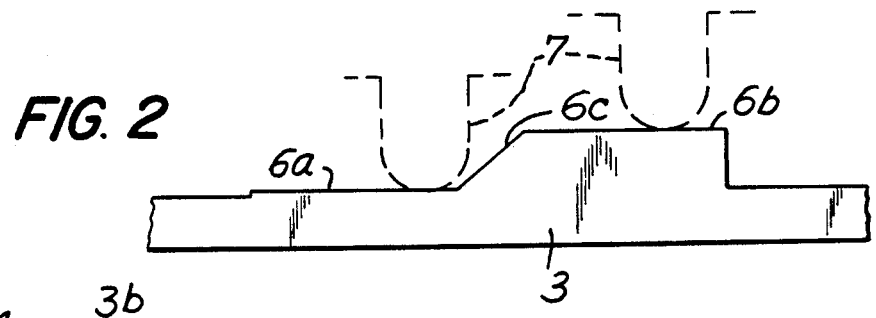

DESCRIPTION OF THE PREFERRED EMBODIMENTS:

The present invention will be described hereafter with reference to the drawings. FIG. 1 and FIG. 2 show a first embodiment of a shutter with a lens drive mechanism according to the present invention.

In FIG. 1, reference numeral 3 denotes a drive ring (a drive member) attached to a shutter aperture of a compact camera, and this drive ring 3 is driven reciprocally (counterclockwise rotation and clockwise rotation) by a step motor M through a pinion 1, and an idler 2, etc. The drive ring 3 is provided with sector cam portions 3a and 3b (exposure actuation areas) for exposure actuation at two locations symmetrically on the peripheral edge portions thereof, and a sector lever 4 which is disposed rotatably in the vicinity of the drive ring 3 and which actuates a non-illustrated sector mechanism is engageable with the sector cam portions 3a and 3b.

A pin 4a is studded in the sector lever 4 and is urged with a non-illustrated spring so that the pin 4a always biasingly abuts against sector cam portions 3a and 3b. When the pin 4a of the sector lever 4 is pushed up or pushed down by the sector cam portions 3a and 3b, the sector lever 4 rotates and actuates the sector mechanism so as to actuate exposure. Also, since sector cam portions 3a and 3b are provided on the drive ring 3 at two locations symmetrically, exposure may be actuated by these sector 3a and 3b, respectively, when the drive ring 3 is rotated counterclockwise or clockwise.

On the surface of the drive ring 3, there is provided a lens cam portion 6 for moving a non-illustrated photographing lens to a focused position in accordance with a focusing signal from a non-illustrated auto-focus unit. As shown also in FIG. 2, the lens cam portion 6 consists of a first step portion 6a which is a little higher than the surface of the drive ring 3, a second step portion 6b which is a little higher than this first step portion 6a and a slanted face portion 6c which makes the first step portion 6a and the second step portion 6b continuous to each other. A lens member 7 engaged with the photographing lens abuts against the lens cam portion 6, and the photographing lens moves upward and downward in FIG. 2 when the drive ring 3 is rotated counterclockwise and clockwise.

That is, the photographing lens is retracted to the long-range position at the first step portion 6a or extended to the short-range position at the second step portion 6b in accordance with the focusing signal from the auto-focus unit. The initial position of the lens member 7 is located on the side of the slanted face portion 6c forming the first step portion 6a. The lens cam portion 6 and the lens member 7 form a range setting means which moves the photographing lens to the focused position.

The operation is as follows. When an object to be photographed is located at a long range, a focusing signal for long range is output to the step motor M from the auto-focus unit. Since the initial position of the lens member 7 is located at the first step portion 6a for long range, the step motor M is not driven, but the photographing lens is already located at the focused position corresponding to the focusing signal for long range. When the drive ring 3 is rotated counterclockwise by the step motor M, the pin 4a of the sector lever 4 is pushed up by the sector cam portion 3a and this sector lever 4 rotates counterclockwise In the next step, when the drive ring 3 is rotated clockwise, the pin 4a is pushed down along the sector cam portion 3a and the sector lever 4 rotates clockwise. In such a manner, the sector mechanism is actuated by the counterclockwise rotation and the clockwise rotation of the sector lever 4, thereby performing exposure actuation.

Next, when the object is located at a short range, a focusing signal for short range is output to the step motor M from the auto-focus unit. Since the lens member 7 is located at the first step portion 6a for long range of the lens cam portion 6, the step motor M rotates the drive ring 3 clockwise and pushes up the lens member 7 to the second step portion 6b for short range, and the photographing lens is moved to the focused position corresponding to the focusing signal for short range.

When the drive ring 3 is rotated further clockwise, the pin 4a of the sector lever 4 is pushed up by the sector cam portion 3b and this sector lever 4 rotates counterclockwise. Then, when the drive ring 3 is rotated counterclockwise, the pin 4a is pushed down along the sector cam portion 3b and the sector lever 4 rotates clockwise. In such a manner, the sector mechanism is actuated by counterclockwise rotation and clockwise rotation of the sector lever 4, thereby to actuate exposure. At this time, the lens member 7 only moves within the second step portion 6b and the photographing lens is held within the short-range position.

Accordingly, a range ring, a retaining lever, a release lever and the like in a conventional unit are no longer required for moving the photographing lens to a focused position corresponding to the focusing signal so as to perform exposure actuation. Thus, the construction of the shutter becomes simple as a whole and it is possible to reduce the number of parts.

Figure 3:
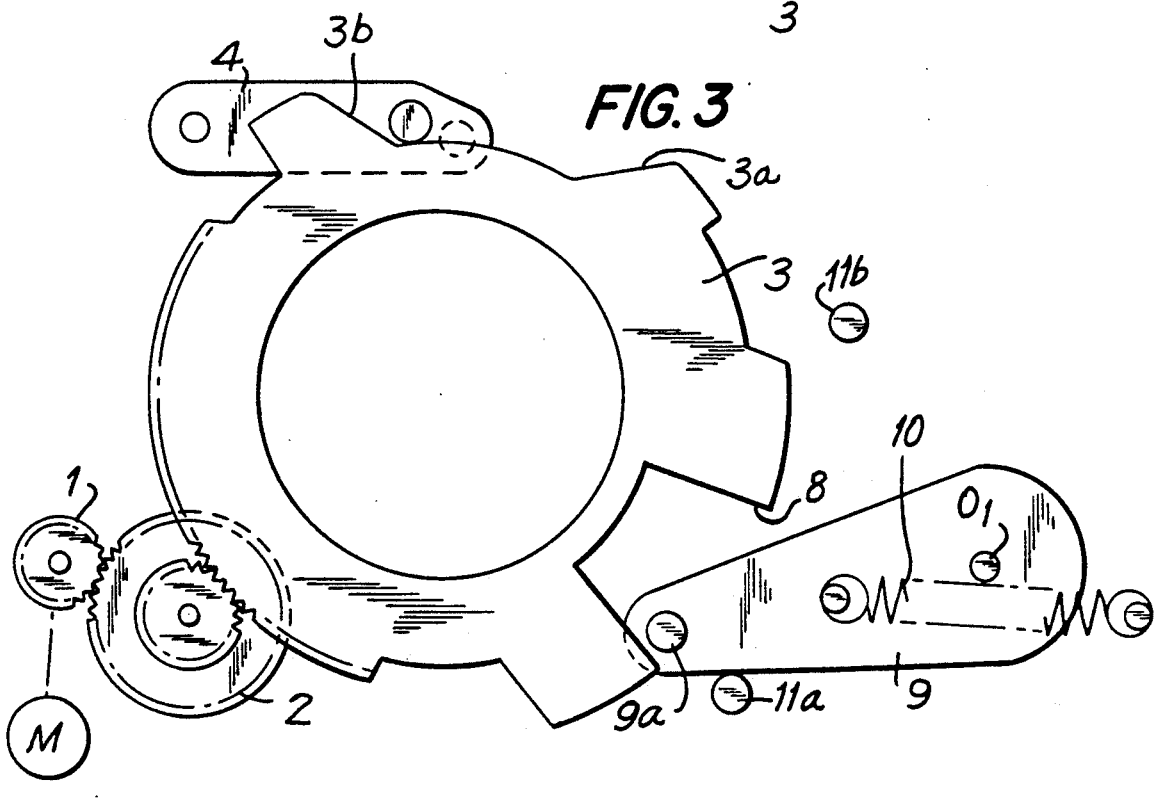

FIG. 3 and FIG. 4 show a second embodiment of a shutter with a lens drive mechanism according to the present invention. The same numerals are assigned to those members that are the same as in the first embodiment and an explanation thereof is omitted in this embodiment and the embodiments hereafter.

In FIG. 3, an actuating recessed portion 8 is formed on a peripheral edge portion of the drive ring 3, and a lens drive lever 9 is disposed rotatably at a location corresponding to the actuating recessed portion 8. A pin 9a provided at the point of the lens drive lever 9 is disposed in the actuating recessed portion 8, and a tension spring 10 is stretched between the lens drive lever 9 and a non-illustrated shutter body across a rotation center $O_1$ of the lens drive lever 9. The lens drive lever 9 is pivotable and thus pivots counterclockwise or clockwise when a change point is exceeded, and such counterclockwise and clockwise pivoting is restricted by a pair of stopper portions 11a and 11b.

When the drive ring 3 is rotated counterclockwise or clockwise by the step motor M, the lens drive lever 9 is rotated clockwise or counterclockwise because the pin 9a is disposed in the actuating recessed portion 8. Since a non-illustrated helicoid member is engaged with the lens drive member 9, the photographing lens is moved to a focused position corresponding to the focusing signal by the counterclockwise rotation or the clockwise rotation of the lens drive lever 9. The actuating recessed portion 8, the lens drive lever 9, the pin 9a, the tension spring 10, and the stopper portions 11a and 11b form a range setting means as a whole.

Figure 6:
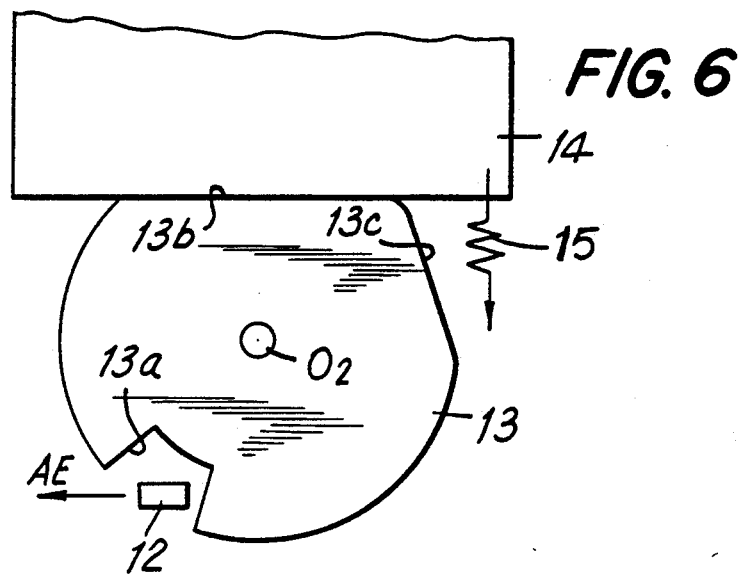

FIG. 5 through FIG. 8 show a third embodiment of a shutter with a lens drive mechanism according to the present invention. In FIG. 5, an actuating protrusion 12 is formed on a peripheral edge portion of the drive ring 3, and this actuating protrusion 12 is located at an actuating recessed portion 13a of a lens drive member 13 having an approximately disc shape as shown in FIG. 6. On the peripheral edge portion of the lens drive member 13, lens cam faces 13b and 13c are formed at a short distance and a long distance, respectively, from a rotation center $O_2$ thereof, and these cam faces 13b and 13c are contiguous. Also, a lens member 14 engaged with a non-illustrated photographing lens abuts against the lens cam faces 13b and 13c of the lens drive member 13, and this lens member 14 is urged by a tension spring 15 toward the lens cam faces 13b and 13c.

Figure 7:
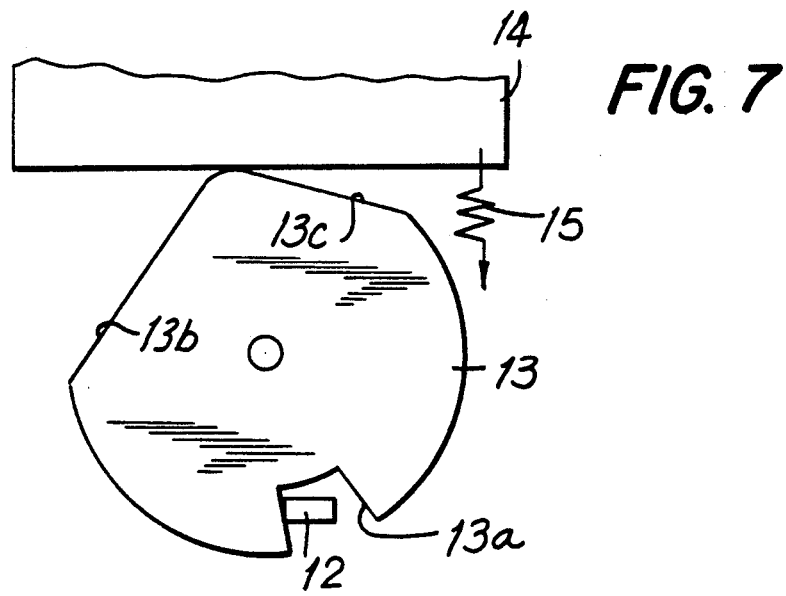

When the drive ring 13 is rotated counterclockwise or clockwise by the step motor M, the lens drive member 13 is rotated counterclockwise or clockwise by the actuating protrusion 12. When the lens drive member 13 is rotated counterclockwise or clockwise, the lens member 14 moves upward and downward so as to move the photographing lens to a focused position as shown in FIG. 6 and FIG. 7 corresponding to the focusing signal.

Figure 8:
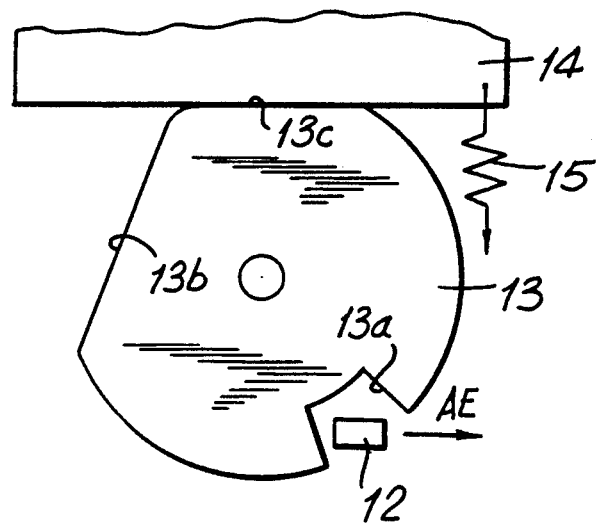

Since the actuating protrusion 12 located at the actuating recessed portion 13a is located on the side of the opening of this actuating recessed portion 13a, it is possible to move further in the left and right direction as indicated by the arrows AE in FIG. 6 and FIG. 8. As a result, the sector cam portions 3a and 3b are not restricted by the actuating recessed portion 13a, but the exposure actuation is performed properly by the sector lever 4. The actuating protrusion 12, the lens drive member 13, the actuating recessed portion 13a, the lens cam faces 13b and 13c, the lens member 14 and the tension spring 15 form a range setting means as a whole.

Figure 9:
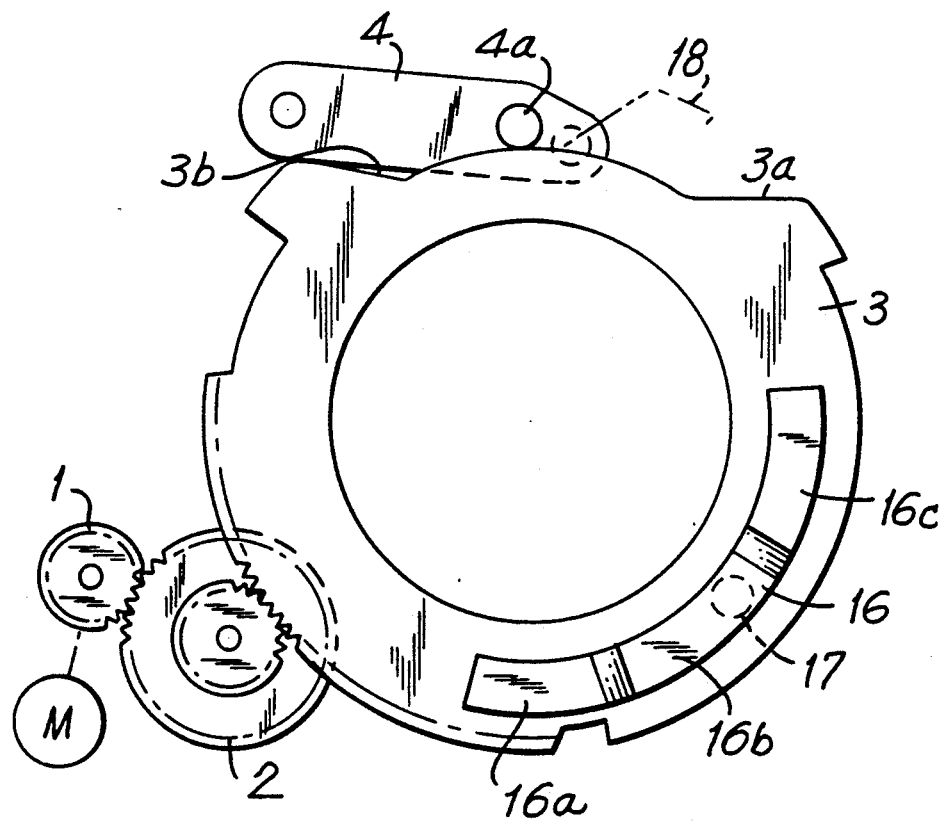
FIG. 9 and FIG. 10 show a fourth embodiment of a shutter with a lens drive mechanism according to the present invention, FIG. 9 being a front view of the shutter and FIG. 10 being a side view showing the range setting means thereof.
Figure 10:
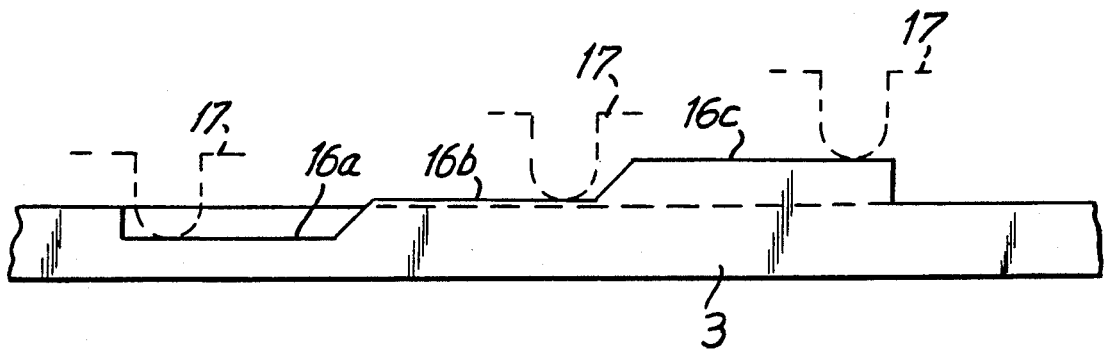
Figure 11:
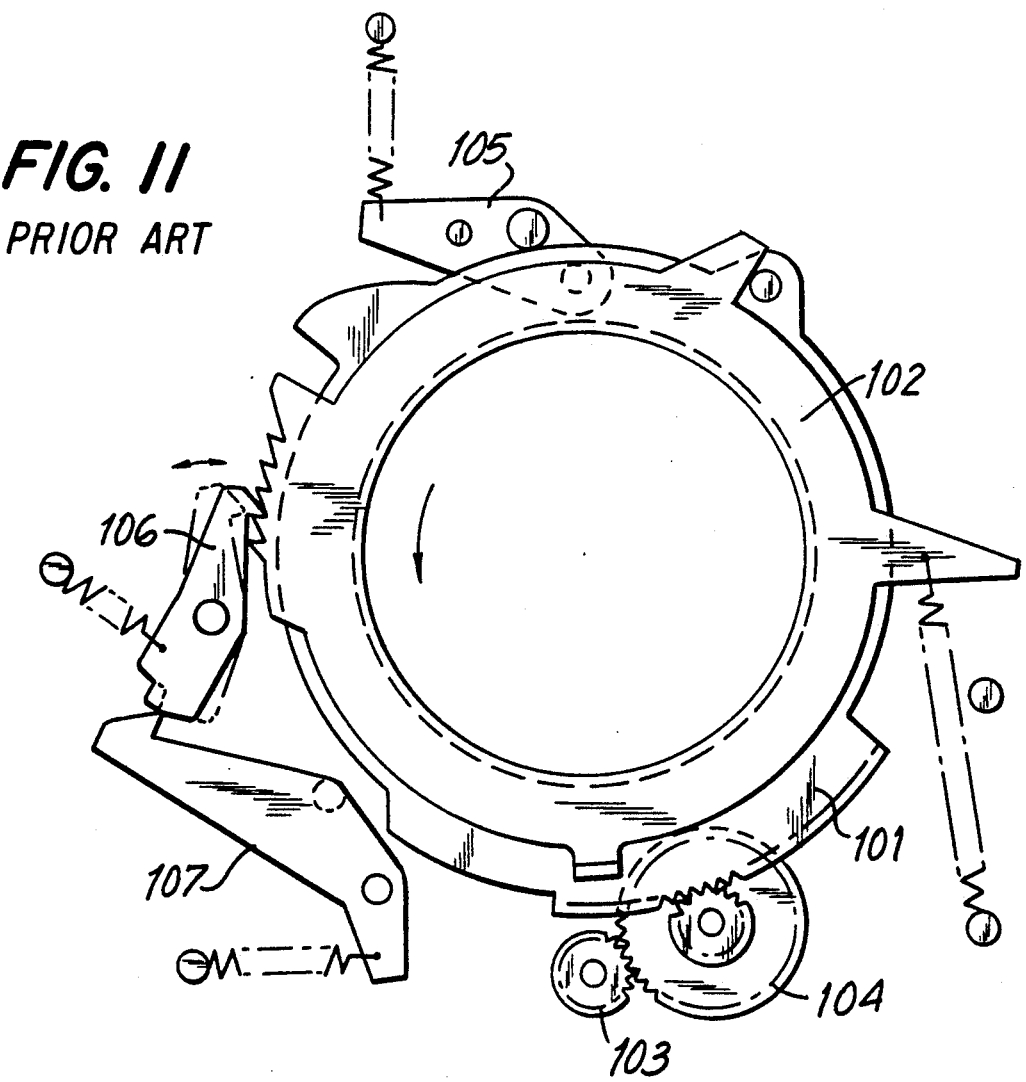
FIG. 11 is a front view showing a conventional shutter with a lens drive mechanism.

FIG. 9 and FIG. 10 show a fourth embodiment of a shutter with a lens drive mechanism according to the present invention. In these Figures, a lens cam portion 16 provided on the drive ring 3 is composed of a first step portion 16a, a second step portion 16b and a third step portion 16c. A lens member 17 abutting against the first, the second and the third step portions 16a, 16b and 16c is moved by the rotation of the drive ring 3 thereby to move the photographing lens to a long-range position, an intermediate-range position and a short-range position in accordance with the focusing signal.

When the photographing lens is moved to an intermediate range by a focusing signal, a cam member 18 moves to a position where the pin 4a of the sector lever 4 may be pushed up by a nonillustrated clutch mechanism. Next, the cam member 18 is coupled with the drive ring 3 in one body by means of a non-illustrated coupling mechanism. When the drive ring 3 is rotated, the sector lever 4 is rotated, thereby to perform exposure operation. The lens cam portion 16 and the lens member 17 form a range setting means as a whole.

As described above, according to the present invention, the drive member is provided with a range setting means which moves the photographing lens to a focused position by the rotation thereof, and a plurality of exposure actuation areas are also provided for performing exposure actuation in accordance with a plurality of focused positions of the photographing lens. Accordingly, a range ring, a retaining lever, a release lever and the like in a conventional unit are no longer required, and therefore the construction of the shutter becomes simple as a whole and the number of parts may be reduced.

Although the present invention has been described through specific terms, it should be noted here that the described embodiments are not necessarily exclusive and that various changes and modifications may be imparted thereto without departing from the scope of the invention, which is limited solely by the appended claims.

What we claim is:

1. A drive mechanism for a camera having a lens, the combination comprising:
    a drive member;
    a motor means for driving said drive member in a clockwise and a counterclockwise direction;
    range setting means operated by said drive member operable to effect movement of a lens member to a plurality of positions corresponding to a plurality of focused positions of said lens when said drive member is rotated by said motor means;
    an exposure actuation means operable upon actuation to effect exposure operation of the camera; and
    actuating cam means on said drive member for actuating said exposure actuation means as said range setting means maintains a focused position of said lens.

2. A drive mechanism according to claim 1, wherein said actuating cam means comprises at least two actuating cam surfaces on said drive member disposed such that rotation of said drive member in one direction causes one of said actuating cam surfaces to actuate said exposure actuation means and rotation of said drive member a direction opposite to said one direction causes the other of said actuating cam surfaces to actuate said exposure actuation means.

3. A drive mechanism according to claim 1, wherein said range setting means is operable to maintain said lens member in one of said plurality of positions when said drive member is rotated in one direction to actuate said exposure actuation means and to maintain said lens member in another of its positions when said drive member is rotated in a direction opposite to said one direction to actuate said exposure actuating means.

4. A drive mechanism according to claim 1, wherein said range setting means comprises a stepped cam means on said drive member having cam stepped sections with one cam section being thicker than another cam section.

5. A drive mechanism according to claim 1, wherein said range setting means comprises at least two step cam surfaces operably engageable with said lens member for moving said lens member to at least two different member positions corresponding to two different focused positions, said actuating can means comprising at least two actuating cam surfaces on said drive member for actuating said exposure actuation means as said range setting means maintains said lens member in either one of said two member positions.

6. A drive mechanism according to claim 5, wherein said range setting means comprises a third step cam surface operably engageable with said lens member for moving said lens member to a third member position corresponding to a third focused position, said actuating cam means comprising a third cam actuating surface driven by said drive member for actuating said exposure actuation means as said range setting means maintains said lens member in said third member position.

7. A drive mechanism according to claim 4, wherein said cam sections are annular sections.

8. A drive mechanism according to claim 4, wherein said stepped cam means further comprises a slanted transition section between said one and said another cam sections.

9. A drive mechanism according to claim 1, wherein said range setting means comprises a pivotal lever pivotal between a first lever position corresponding to one focused position of said lens and a second lever position corresponding to another focused position of said lens, biasing means biasing said lever in each of said lever positions, and spaced engaging means on said drive member engageable with said lever for pivoting said lever in one direction toward said one of said lever positions when said drive member is rotated in one direction and for pivoting said lever in an opposite direction toward another of said lever positions when said drive member is rotated in an opposite direction.

10. A drive mechanism according to claim 9, wherein said pivotal lever is pivotable about a pivot axis, said biasing means comprises an elongated spring having an elongate axis disposed on one side of said pivotal axis when said lever is in said one lever position and disposed on an opposite side of said pivotal axis when said lever is in said another lever position.

11. A drive mechanism according to claim 10, wherein said engaging means comprises spaced projections on said drive member, said lever having an engageable part operable in the space between said projections and engageable by said projections when said drive member is rotated in said clockwise and counterclockwise directions 12. A drive mechanism according to claim 9, further comprising stop means engageable with said lever when said lever is in said first and second lever positions.

13. A drive mechanism according to claim 1, wherein said range setting means comprises a rotatable setting cam rotatably between a first cam position corresponding to one focused position of said lens and a second cam position corresponding to another focused position of said lens, and engaging means on said drive member engageable with said setting cam for effecting rotation of said setting cam between said first and second cam positions.

14. A drive mechanism according to claim 13, wherein said engaging means comprises a projection extending from said drive member, said setting cam having a recess which receives said projection, said projection being movable out of said recess as said drive member continues to rotate as said stepping cam remains disposed in said first and second cam positions.

15. A drive mechanism according to claim 13, further comprising biasing means biasing said lens member toward said setting cam, said lens member having a flat section, said setting cam having a first and a second flat cam portion, said first flat cam portion abutting said flat section of said lens member when said setting cam is in said first cam position, said second flat cam portion abutting said flat section of said lens member when said setting cam is in said second cam position.

16. A drive mechanism according to claim 15, wherein said rotatable setting cam rotates about an axis of rotation, said first and second flat cam portions each being disposed at a different distance from axis of rotation of said setting cam.

17. A drive mechanism according to claim 15, wherein said setting cam comprises a disc having an outer periphery, said first and second flat cam portions being located on said outer periphery of said disc, said first and second flat cam portions being contiguous such that said first and second flat cam portions define an included angle.

18. A drive mechanism according to claim 15, wherein said setting cam has a peripheral portion between said first and second flat cam portions, said recess being located in said peripheral portion.

19. A drive mechanism according to claim 2, wherein said two actuating cam surfaces are circumferentially spaced from one another.

20. A drive mechanism according to claim 1, wherein said exposure actuation means comprises a pivotal lever in biasing contact with said drive member.

* * * * *